(12) United States Patent
Birkbeck et al.

(10) Patent No.: US 7,014,742 B2
(45) Date of Patent: Mar. 21, 2006

(54) POSITIONING OF ORGANIC AND INORGANIC OBJECTS BY ELECTROPHORETIC FORCES, INCLUDING FOR MICROLENS ALIGNMENT

(75) Inventors: Aaron L. Birkbeck, La Jolla, CA (US); Sadik C. Esener, La Jolla, CA (US); Mihrimah Ozkan, La Jolla, CA (US); Erhan Ata, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 313 days.

(21) Appl. No.: 10/099,133

(22) Filed: Mar. 15, 2002

(65) Prior Publication Data

US 2003/0010636 A1 Jan. 16, 2003

Related U.S. Application Data

(60) Provisional application No. 60/276,679, filed on Mar. 15, 2001.

(51) Int. Cl.
*G01N 27/447* (2006.01)
*G01N 27/453* (2006.01)
*G02F 1/29* (2006.01)

(52) U.S. Cl. ............ 204/450; 204/547; 204/600; 204/643; 359/298; 385/4

(58) Field of Classification Search ............ 359/237, 359/298, 315, 319; 385/4, 8; 204/450, 547, 204/600, 643
See application file for complete search history.

(56) References Cited

U.S. PATENT DOCUMENTS 6,264,815 B1 * 7/2001 Pethig et al. ............... 204/547
6,596,143 B1 * 7/2003 Wang et al. ................ 204/547
6,641,708 B1 * 11/2003 Becker et al. .............. 204/547

OTHER PUBLICATIONS

Ullmann's Encyclopedia of Industrial Chemistry, 1988, vol. B3, pp. 11-19 through 11-21.*
Fan, et al., "Heterogeneous integration of optoelectronic components", *Optoelectronic Integrated Circuits II, Proceedings of the SPIE—The International Society for Optical Engineering*, San Jose, California, vol. 3290, pp. 2-7, Jan., 28-30, 1998.

(Continued)

*Primary Examiner*—Kaj K. Olsen
(74) *Attorney, Agent, or Firm*—Fish & Richardson P.C.

(57) ABSTRACT

An adaptive alignment technique provides precise control and active positioning in, preferably, two-dimensions of sub-millimeter-sized objects such as, in one application, spherical mircolenses through the application of electrophoretic forces in a microfluidic wells. A lithographically patterned microfluidic well and electrodes can be addressed to position or align a spherical microlens to a corresponding laser light beam. The motion of the microlens is preferably controlled using CMOS compatible voltages (3V–1 $\mu$A) that are preferably applied to opposite electrodes in the microfluidic well, creating an electrical field in a well solution. By applying voltages to opposed electrode pairs, movement of spherical microlenses with sizes ranging from, most typically, 0.87 $\mu$m to 40 $\mu$m in directions parallel to the electrode surface is realized. Under a bias of 3 volts, the microspheres have electrophoretic velocities ranging from 13 to 16 $\mu$m/s. Optical alignment of the spherical microlens, as is preferably accomplished by use of feedback from a photo detector, serves to position the microlens for maximum efficiency. Microlenses or other optical elements may thus be aligned to optical fibers, VCSELs, LEDs, photodetectors, etc.

22 Claims, 7 Drawing Sheets

OTHER PUBLICATIONS

Esener, et al., "DNA-Assisted Asembly of Photonic Devices and Crystals", *Trends in Optics and Photonics Spatial Light Modulators, Optical Society of America* vol. Xiv, pp. 65-68, Mar., 17-19, 1997.

Song, et al., "Three-dimensional photonic crystal structures achieved with self-organization of colloidal particles", *Optical and Quantum Electronics*, vol. 32, pp. 1295-2000, Dec., 2000.

Hayward, et al., "Electrophoretic assembly of colloidal crystals with optically tunable micropatterns", *Nature*, vol. 404, No. 6773, Mar., 2000.

Xia, et al., "Fabrication of Three-Dimensional Photonic Crystals for Use in the Spectral Region from Ultraviolet to Near-Infrared", *Journal of Lightwave Technology*, vol. 17, No. 11, pp. 1956-1962, Nov., 1999.

Ozkan, et al., "Massively parallel low-cost pick-and-place of optoelectronic devices by electrochemical fluidic processing", *Optics Letters*, vol. 25, No. 17, pp. 1285-1287, Sep. 1, 2000.

Ozkan, et al., "Heterogeneous Integration through Electrokinetic Migration", *IEEE Engineering in Medicine and Biology*, pp. 144-151, Nov./Dec., 2001.

Ozkan, et al., "A New Optical and Electric-Field Assisted Fluidic Pick and Place Technique", *Optics in Computing*, pp. 1021-1026, Jun., 18-23, 2000, Quebec City, Canada.

Sawatzky, et al., "Hydrodynamics of electrophoretic motion in an alternatic electric field", *J. Fluid Mech.*, vol. 246, pp. 321-334, Jan., 1993.

Ramos, et al., "The role of electrohydrodynamic forces in the dielectrophoretic manipulation and separation of particles", *Journal of Electrostatics*, vol. 47, pp. 71-81, 1999.

Henry, "The Cataphoresis of Suspended Particles. Part I. The Equation of Cataphoresis", *Proceedings of the Royal Society of London. Series A, Papers of a Mathematical and Physical Character*, vol. 133, No. 821, pp. 106-129, Sep. 1, 1931.

Taghizadeh, et al., "Micro- and Nano-optics for Optical Interconnection and Information Processing", *Proceedings of SPIE— The International Society for Optical Engineering*, vol. 4455, pp. iii-vi, San Diego, California, Jul. 29-31, 2001.

* cited by examiner

POSITIONING OF ORGANIC AND INORGANIC OBJECTS BY ELECTROPHORETIC FORCES, INCLUDING FOR MICROLENS ALIGNMENT

RELATION TO A PROVISIONAL PATENT APPLICATION

The present patent application is descended from, and claims benefit of priority of, U.S. provisional patent application Ser. No. 60/276,679 filed on Mar. 15, 2001, for POSITIONING OF ORGANIC AND INORGANIC OBJECTS BY ELECTROPHORETIC FORCES to the selfsame inventors as the present patent application.

This invention was made by support of the U.S. Government under Grant No. DARPA-MD A972-00-1-0019 acting through the United States Defense Advanced Research Project Administration (DARPA) via the CHIPS Opto-center and the University of California, San Diego. The U.S. Government has certain rights in this invention.

BACKGROUND OF THE INVENTION

1. Field of the Invention

The present invention generally concerns microlenses, electrophoresis, microfluidics, alignment, two-dimensional alignment and microfluidic wells.

The present invention particularly concerns precise control and active positioning of sub-millimeter-sized spherical lenses in two-dimensions through the application of electrophoretic forces in a microfluidic well, including for the active alignment of microlenses to optical fibers, VCSELs, LEDs, photodetectors, etc.

2. Description of the Prior Art 2.1 Electrophoresis and Electrophoretic Forces

The present invention will be seen to involve electrophoresis, and electrophoretic forces.

Electrophoresis, which is the motion of a charged particle under an applied DC electric field in an electrolyte solution, has a very robust history in the biological and chemical sciences with such uses as DNA and protein sequencing. See, for example, Hindley, J., Staden, R., *DNA sequencing*, Elsevier Biomedical Press, New York, N.Y., 1983. Colloidal chemistry is also supported. See, for example, Hiemenz, P. C., *Principles of Colloid and Surface Chemistry*, chpts. 12–13, Marcel Dekker, 1986.

In the past decade, with the maturation of semiconductor processing and optics technologies, the use of the electrophoretic force has been integrated into the optics and electronics fields producing results such as heterogeneous integration of electrical components using pick-and-place techniques. See Chi Fan, Shih, D. W., Hansen, M. W., Hartmann, D., Van Blerkom, D., Esener, S. C., and Heller, M., "Heterogeneous integration of optoelectronic components", *Proceedings of the SPIE—The International Society for Optical Engineering*, vol. 3290, pp. 2–7, Optoelectronic Integrated Circuits II, San Jose, Calif., USA, Jan. 28–30, 1998. See also Esener, S. C., Hartmann, D., Guncer, S., Chi Fan, Heller, M., Cable, J., "DNA-assisted assembly of photonic devices and crystals", *OSA Trends in Optics and Photonics Series, Spatial Light Modulators*, edited by: Burge, G. and Esener, S. C., vol. 14, pp. 65–8, Proceedings of Spatial Light Modulators, Incline Village, Nev., USA, Mar. 17–19, 1997.

Further results are reported in the assembling of colloidal particles to produce photonic structures. See Song, J., Sun, H., Xu, Y., Fu, Y., Matsuo, S., Misawa, H., "Three-dimensional photonic crystal structures achieved with self-organization of colloidal particles", *Optical and Quantum Electronics*, vol. 32, no. 12, pp. 1295–300, December 2000. See also Hayward, R. C., Saville, D. A., Aksay, I. A., "Electrophoretic assembly of colloidal crystals with optical tunable micropatterns", *Nature*, vol. 404, no. 6773, pp. 56–9, March 2000. See also Younan, Xia, Gates, B., Sang Hyun Park, "Fabrication of three-dimensional photonic crystals for use in the spectral region from ultraviolet to near-infrared", *Journal of Lightwave Technology*, vol. 17, no. 11, pp. 1956–62, November 1999.

Still further key research is reported in the relatively new fields of Optical MEMS and Bio-MEMS. See M. Ozkan, C. Ozkan, O. Kibar and S. Esener, "Massively parallel low cost pick and place of optoelectronic devices via electrochemical fluidic processing", *Optical Letters*, September 2000. See also M. Ozkan, C. Ozkan, O. Kibar, M. Wang, S. Bhatia and S. Esener, "Heterogeneous Integration of Biological Species and Inorganic Objects by Electrokinetic Movement", *IEEE Journal of EMB Magazine*, in press, 2001. See also M. Ozkan, O. Kibar, C. Ozkan and S. Esener, "A new optical and electric-field assisted fluidic technique for pick and place of electronic devices", *OC'2000*, Quebec, Canada, Jun. 18, 2000.

Up to now, research using electrophoresis has mainly focused on sub-micron particles and has not particularly been extended into tens to hundreds of micron-sized particles, where the electrophoretic force can still be quite strong.

2.2 Optical Interconnects and Microlenses

The present invention will be seen to be of use in optical interconnects using, inter alia, active alignment of microlenses.

One of the key technology hurdles to optical interconnects has been the accurate alignment of microlenses for the collimation or focusing of directed beam sources. For individual laser sources or single optical fibers, current technologies such as photoresist reflow and microjet printing are widely known and have produced high quality microlenses, but these technologies have a distinct limitation when fabricated in an array form. The requirement of high precision in the initial alignment of the lens array and the fixed pitch spacing of these lenses make it extremely difficult to compensate for variations in the individual source locations that can occur over time, i.e. through mechanical vibrations, or from one array to another, without dramatically increasing the size of the microlens.

One solution to this problem would be an electrically addressed array of microlenses that permitted individual alignment of each lens to its corresponding source. The present invention will be seen to support this.

SUMMARY OF THE INVENTION

The present invention contemplates precise control and active positioning of micrometer size organic and inorganic objects in two dimensions through the use of electrophoretic forces in a microfluidic well. More precisely, the present invention contemplates using (i) electrodes in contact with (ii) a liquid-containing (iii) micro-well structure—a microfluidic well—for the purpose of active transportation and placement of organic and inorganic objects located within the micro-well by action of an electric field created within the micro-well. The liquid-containing micro-well structure is, by established conventions in naming types of micro-wells, called a "microfluidic well" (and not a "fluidic micro-well" as some might deem appropriate). The combination (i) electrodes, and (ii) micro-well, structure is called an "electrophoretic micro-well".

By inserting an object or objects (of a first dielectric permittivity) into the electrophoretic well (also containing fluid of a second dielectric permittivity), it is possible to actively move and/or rotate the object(s) in two dimensions using very low voltages and currents by producing an electrophoretic interaction between the charged object(s) and the electrodes. By altering any of (i) the electrode symmetry, (ii) the dielectric permittivity of the fluid, (iii) the viscosity of the fluid, (iv) the microfluidic well shape and volume, (v) the electrode(s) numbers, position(s), shape(s) and size(s), and/or (v) the voltage signal(s) as are applied to the electrode(s), it is possible to manipulate a large variety of objects from microlenses to biological cells.

The (i) electrodes and (ii) micro-well structures are preferably fabricated together, and preferably upon a glass substrate. The electrodes, in particular, are preferably lithographically patterned, and are preferably made of gold. The micro-well, in particular, is preferably formed from photopolymer resist that is lithographically patterned so as to create the micro-well structure. In the event that the micro-well, and the electrophoretic micro-well of which it forms a portion, are to be used on biological specimens, then it is preferred to use a biologically compatible negative photoresist.

In use the micro-well is filled with liquid that has a dielectric permittivity different than that of any organic and/or inorganic object that will be placed within the micro-well. The liquid is thus a "dielectric fluid", and is most commonly de-ionized water (DI $H_2O$) or other compatible biological buffer solution. Most organic and/or inorganic objects will have a dielectric permittivity differing from DI $H_2O$, and since strength of an electric field between the electrodes of the electrophoretic micro-cell can be adjusted as high as reasonably desired, realization of a controlled electrophoretic force on an object of one dielectric permittivity immersed in the fluid of a differing dielectric permittivity is not difficult. Normally the immersed object will be the more negative, and will be attracted to all positive electrodes and repulsed from all negative electrodes (although the opposite relationship can be realized, and is equally functional).

The present invention further contemplates manipulation of small organic and inorganic objects in, and by, an electrophoretic micro-well for any number of purposes.

For example, the precise control and active positioning in two dimensions of micrometer-size spherical lenses—spherical microlenses—through the use of electrophoretic forces in a microfluidic well—the electrophoretic micro-well—is contemplated. Both the (i) planar electrodes and (ii) a microfluidic well are, as is preferred, both (1) lithographically-patterned and (2) fabricated on an optically transparent glass substrate. A spherical microlens inserted into the electrophoretic well can be actively moved in two dimensions, and parallel to planar electrodes, by use of such very low voltages and currents as produce an electrophoretic interaction between the charged object—the spherical microlens—and the electrodes. By creating an array of such electrophoretic micro-wells it is possible to achieve an adaptive microlens array. The spherical microlens so controlled in position by action of the electrophoretic micro-well may be used for any of laser beam deflection, modulation, and alignment.

For example, in use of the electrophoretic micro-well with biological matter a microliter volume centrifuge may be realized. In such case biological cells undergo electro-rotation in electrophoretic micro-wells having (i) circularly-symmetric patterning of multiple electrodes and (iii) phased application of voltage to the multiple electrodes.

More routine forms of cell alignment and patterning within, and by use of, the electrophoretic micro-well are also possible with both AC and DC electric fields. For example, cells can selectively be brought to positions, and successive positions, where they can be any of sensed, reacted, or observed.

1. An Apparatus for Moving a Micrometer Size Organic or Inorganic Object

Accordingly, in one of its aspects the present invention is embodied in an apparatus for moving a micrometer size organic or inorganic object having a first dielectric permittivity.

The apparatus has an electrophoretic micro-well including a substrate, a micro-well on the substrate, and electrodes on the substrate in position to produce an electrical field in the micro-well. The electrodes are used in conjunction with an external source of electricity connected to the electrodes for producing the electrical field in the micro-well.

The apparatus also has, at least during times of use, a dielectric fluid having a second dielectric permittivity different from the first dielectric permittivity. This dielectric fluid is upon the substrate and within the micro-well.

In such an apparatus the micrometer size organic or inorganic object placed within the micro-well will undergo movement by process of electrophoresis when the electric field is produced.

The apparatus may be used to induce positional movement of the object in one dimension in which case the electrophoretic micro-well includes at least two electrodes, or in two dimensions in which case the electrophoretic micro-well includes at least three, and more commonly four, electrodes.

The apparatus may alternatively, or additionally, be used to induce angular rotational movement of the object, in which case the electrophoretic micro-well normally includes at least four electrodes.

The apparatus so constructed may be used, for example, for the positional transportation and placement of an optical element such as a microlens, particularly a two-dimensional positional transportation and placement of the microlens. Should a laser light beam be passed through the microlens so positioned then the direction of this laser light will be altered in accordance with the position of the microlens, making that the laser beam has effectively been directionally steered, or switched, by electricity as has produced electrophoretic forces on a microlens.

The preferred substrate material of the apparatus is glass or quartz. The micro-well is preferably formed from lithographically patterned photopolymer resist. The electrodes are preferably formed from lithographically patterned gold.

In a variant construction four or more electrodes are circularly symmetrically arrayed about the micro-well. The applied source of electricity then consists of differing-phase electrical voltages applied to each of the four or more electrodes so as to induce an angular rotational torque on a micrometer size organic or inorganic object placed within the micro-well.

In this variant apparatus the object in which the angular rotational torque is induced can be within cell, and the induced rotation of this object can serve to produce a shear force upon an inner surface of the cell. This rotating angular force on the object can even produce a shear force of the surface of the cell sufficient to permit the object to escape the cell; ergo the object is separated from the cell by electrophoretic forces.

2. A Method of Moving Micrometer Size Organic and Inorganic Objects

In another of its aspects the present invention is embodied in a method of moving a micrometer size organic and inorganic object having a first dielectric permittivity.

The method consists of placing the object in an electrophoretic micro-well having (i) a substrate, (ii) a micro-well on the substrate, (iii) electrodes on the substrate in position to produce an electrical field in the micro-well, and (iv) a dielectric fluid, having a second dielectric permittivity different from the first dielectric permittivity, upon the substrate in the micro-well; and applying electrical energization to the electrodes sufficient to move the object in the micro-well by electrophoretic forces.

In the method direct current, d.c., electrical energization can be applied to the electrodes sufficient to cause the object to assume move at a steady-state velocity, called the electrophoretic velocity, in the fluid. Alternatively, or additionally, an alternating current, a.c., electrical energization can be applied to the electrodes sufficient to cause motion of the object by dielectrophoresis.

The method can be used to move an object that is detectable by a laser light beam. Clearly progress in moving the object may then be detected by the laser light beam. For example, the method can be used to move a microlens that is detectable by a laser light beam, and can be used to move the microlens so as to become aligned to the laser light beam. The laser light beam may in particular arises from any one(s) of a group of sources of compact laser light beams including optical fibers, VCSELs, LEDs, and photodetectors. The microlens aligned to a laser light beam from such a source is most typically of a diameter not more than 25% greater than is a diameter of the laser light beam itself, and may indeed be nearly the same diameter as the laser light beam. This close matching is permitted, unlike in the prior art, because the alignment is so precise, making that only insubstantial laser light will not be impingent upon the microlens as and when aligned.

The method can be performed on an object placed in an electrophoretic micro-well having four or more electrodes on the substrate in position to produce an electrical field in the micro-well, with each of the four or more electrodes energized so as to selectively move the object in two dimensions. Still further, the four or more electrodes are circularly arrayed about the micro-well, and the applying of electrical energization of different phase to each of the four if electrodes can induce an angular rotational torque on the micrometer size organic or inorganic object placed within the micro-well.

The method can be used to induce angular rotational torque on an object located within a cell, and an induced rotation of this object produces a shear force upon an inner surface of the cell. The method can even be used to produce from the angularly rotating object such a shear force on the interior wall of the cell as is sufficient to permit the object to penetrate the wall, and to escape the cell.

3. An Apparatus for Aligning a Micrometer Size Optical Element to a Narrow Laser Light Beam In yet another of its aspects the present invention is embodied in an apparatus for aligning a micrometer size optical element to a narrow laser light beam such as may typically arise at any of an optical fiber, a VCSELs, a LEDs, and a photodetector.

The preferred apparatus includes both (i) an electrophoretic micro-well having a substrate, a micro-well on the substrate, electrodes on the substrate in position to produce an electrical field in the micro-well, a dielectric fluid, having a second dielectric permittivity different from the first dielectric permittivity, upon the substrate in the micro-well, and (ii) a source of electricity connected to the electrodes for producing the electrical field in the micro-well. A micrometer size optical element placed within the micro-well will undergo positional transportation and placement by process of electrophoresis in order that it may be aligned to a laser light beam.

The apparatus may be, and preferably is, used to align a microlens, most preferably in two dimensions. This makes that the electrophoretic cell most commonly has four or more electrodes, the source of electricity acting to energize the four or more electrodes so as to create orthogonal electrical field components in the micro-well.

4. An Method of Aligning a Micrometer Size Optical Element to a Narrow Laser Light Beam In still yet another of its aspects the present invention is embodied in a method of aligning a micrometer size optical element to a narrow laser light beam such as may typically arise at any of an optical fiber, a VCSELs, a LEDs, and a photodetector.

The method consists of (1) placing the micrometer size optical element in an electrophoretic micro-well having (i) a substrate, (ii) a micro-well on the substrate, (iii) electrodes on the substrate in position to produce an electrical field in the micro-well, and (iv) a dielectric fluid, having a second dielectric permittivity different from the first dielectric permittivity, upon the substrate in the micro-well; and (2) applying electrical energization to the electrodes sufficient to move the micrometer size optical element in the micro-well, and into alignment with an impingent laser light beam, by electrophoretic forces.

As with the apparatus, the method according is preferably used to align a microlens to a laser light beam, and is more preferably used to align the microlens to the laser light beam in two dimensions. Multiple electrophoretic micro-wells each selectively electrically energized may be used to individually align each of a potentially large number of laser light beams as arise from the multiple optic fibers of a fiber optic bundle, or from the multiple VCSELs of a VCSEL array.

These and other aspects and attributes of the present invention will become increasingly clear upon reference to the following drawings and accompanying specification.

BRIEF DESCRIPTION OF THE DRAWINGS

Referring particularly to the drawings for the purpose of illustration only and not to limit the scope of the invention in any way, these illustrations follow:

FIG. 2, consisting of FIG. 2a and FIG. 2b, is a diagram of the use of the electrophoretic micro-well in accordance with the present invention previously seen in FIG. 1 within an optical system with a microlens and a VCSEL.

FIG. 3, consisting of FIGS. 3a through 3c, is a diagram of another embodiment of an electrophoretic micro-cell in accordance with the present invention where polyphase AC excitation is used to create a counter-clockwise rotating electric field.

FIG. 4, consisting of FIGS. 4a through 4e, is a series of photomicrographs illustrating both (i) center alignment and (ii) motion in two orthogonal dimensions within the electrophoretic micro-well in accordance with the present invention previously seen in FIG. 1.

FIG. 6, consisting of FIGS. 6a through 6e, shows the positioning of a 20 μm polystyrene microsphere using the electrophoretic force (V=3V, C=1.1 μA).

FIG. 7, consisting of FIGS. 7a through 7e, shows the positioning of a 40 μm borosilicate microsphere using the electrophoretic force under HeNe laser illumination (V=3V, C=1.0 μA).

DESCRIPTION OF THE PREFERRED EMBODIMENT

The following description is of the best mode presently contemplated for the carrying out of the invention. This description is made for the purpose of illustrating the general principles of the invention, and is not to be taken in a limiting sense. The scope of the invention is best determined by reference to the appended claims.

Although specific embodiments of the invention will now be described with reference to the drawings, it should be understood that such embodiments are by way of example only and are merely illustrative of but a small number of the many possible specific embodiments to which the principles of the invention may be applied. Various changes and modifications obvious to one skilled in the art to which the invention pertains are deemed to be within the spirit, scope and contemplation of the invention as further defined in the appended claims.

1. Electrophoretic Micro-Wells

When a charged object is inserted into an aqueous solution with a different dielectric permittivity, a charge layer will form around the object, called the double layer, due to the coulomb attraction of oppositely charged ions in the solution. When a voltage is applied to the system, the resulting electric field exerts a force on the double layer proportional to the double layer charge density and the magnitude of the tangential component of the electric field. The viscous forces opposing the motion of the object will quickly damp the acceleration due to the electric field force, resulting in a steady-state velocity in the direction of the electric field. The motion of a charged particle under an electric field is termed electrophoresis and the steady-state velocity of the object is called the electrophoretic velocity. If instead of a DC voltage, an AC voltage is applied to the electrodes, the resulting object motion is designated dielectrophoresis, which depends heavily upon the difference between the dielectric permittivities of the object and solution.

Figure 1:
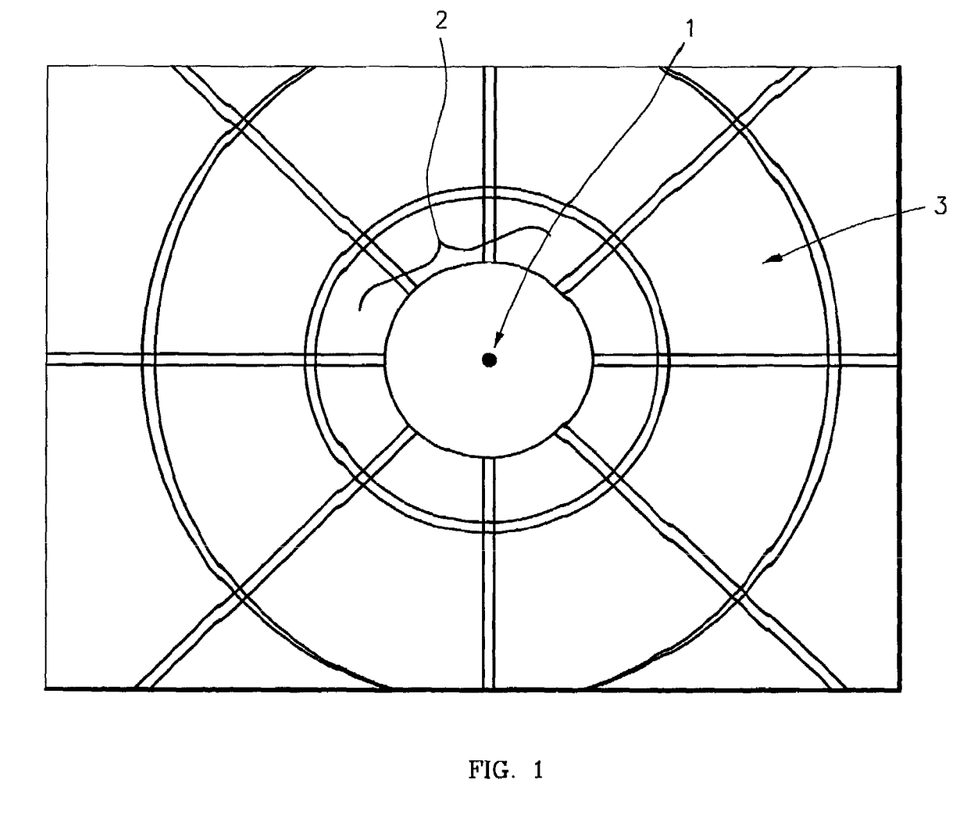
FIG. 1 is a photomicrograph of a first embodiment of an electrophoretic micro-well in accordance with the present invention, the electrophoretic micro-well consisting of the symmetric electrode pattern and the photopolymer microfluidic well.

The electrophoretic micro-well of the present invention is designed to use the electrophoretic and dielectrophoretic forces to actively manipulate an object or cell, producing two-dimensional motion and rotation. A first, rudimentary, embodiment is implemented as a circularly symmetric, patterned electrode structure was placed against a cylindrically shaped, microfluidic well which was itself fabricated using a biologically compatible photopolymer resin. A first embodiment of an electrophoretic micro-well in accordance with the present invention consisting of the symmetric electrode pattern and the photopolymer microfluidic well is shown in FIG. 1.

In this embodiment the volume of the solution is fixed and the response of the object's motion to the applied electric field is a function of the electrode voltage, the charge of the object vs. the conductivity of the solution (proportional to the double layer thickness), the difference in dielectric permittivities between the object and solution, the size of the object, and the viscosity and temperature of the solution.

1.1 An Optical Use of the Electrophoretic Micro-Well

Figure 2A:
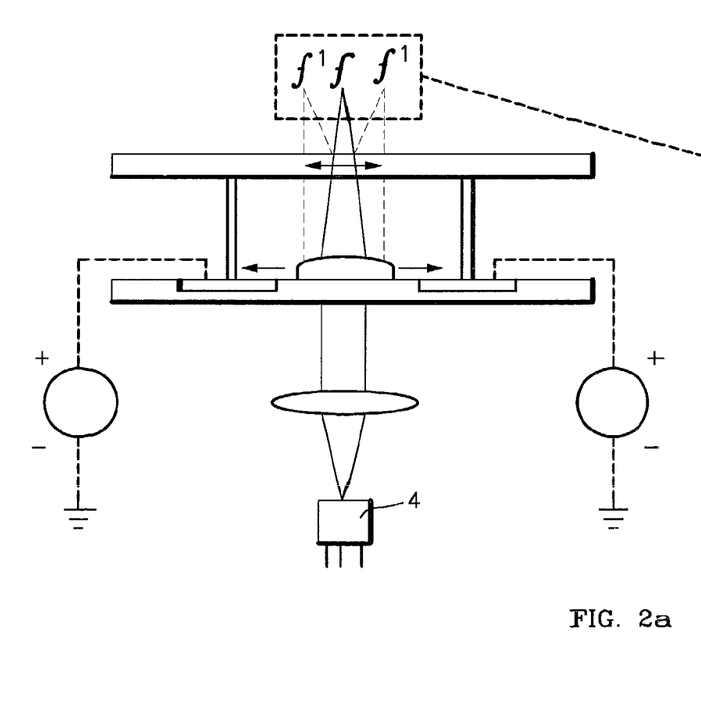
Figure 2B:
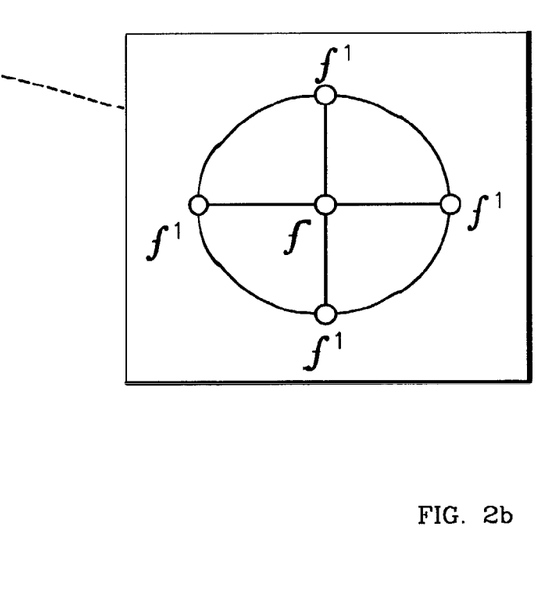

Placing a microlens into the electrophoretic micro-well and shining a laser beam through the transparent substrate permits change in the focal point position by displacing the microlens in two dimensions. The use of the electrophoretic micro-well in accordance with the present invention in an optical system with a microlens and a VCSEL is shown in FIG. 2.

Beam deflection occurs by displacing the microlens in one or two-dimensions. This displacement causes a shift in the focal point of the microlens along the radius of the circle defined by f'–f. Using Snell's law, the radius of the focal point shift can be calculated as a function of the aperture size of the microlens and the numerical aperture of the collimating lens. With the proper electrode symmetry and precise control over the applied voltage, it is possible to deflect the beam to any point that lies within the circle f'–f. If a detector is placed at the point f, it is also possible to modulate the intensity of the light into the detector by inducing an oscillatory motion of the microlens by driving it with a low frequency AC voltage applied to opposite electrodes.

1.2 A Biological Use of the Electrophoretic Micro-well

Taking advantage of the bio-compatibility of the electrophoretic micro-well, it is possible to manipulate biological cells and other organic materials in a similar manner as microlenses were manipulated. If there are multiple different organic materials in the solution volume (having differing dielectric permittivities), then the electrophoretic micro-well can be used as a cell sorter, which separates the organic materials accordingly to their charge using dielectrophoresis.

Additionally, by changing the electrode pattern and symmetry, it is possible to aggregate like-charged materials into predetermined areas.

Figure 3A:
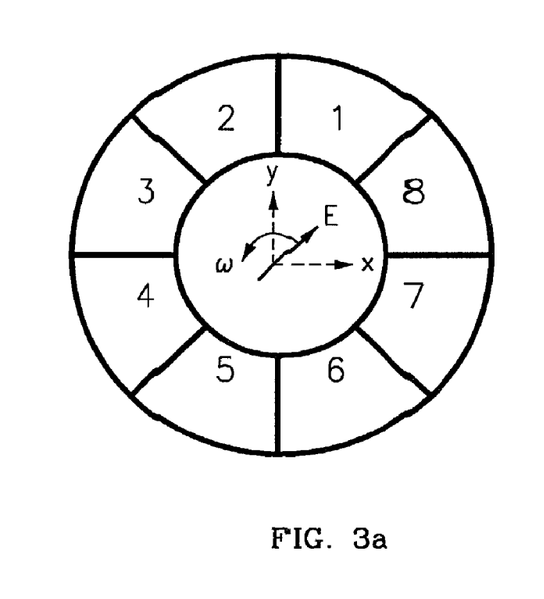
Figure 3B:
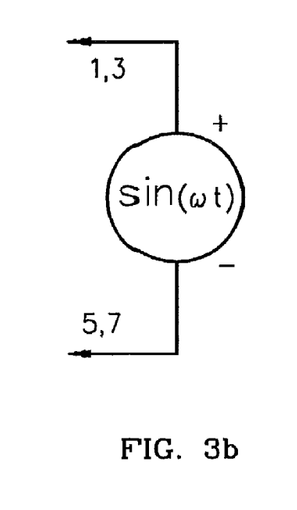
Figure 3C:
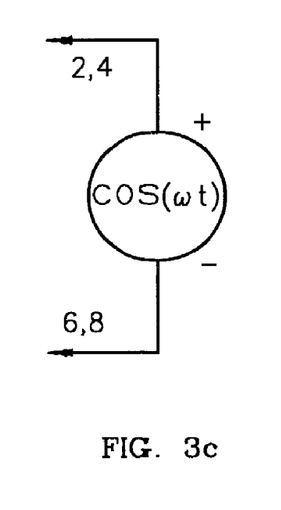
Figure 4A:
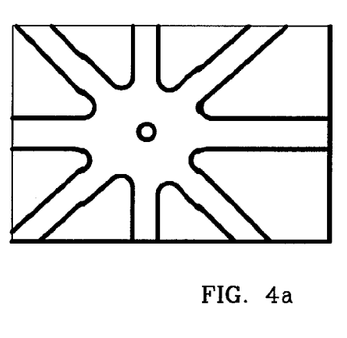
Figure 4B:
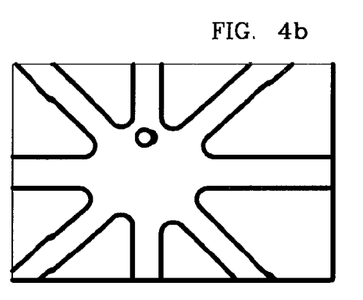
Figure 4C:
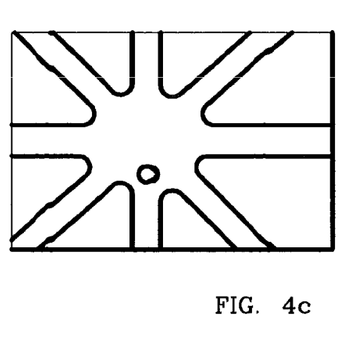
Figure 4D:
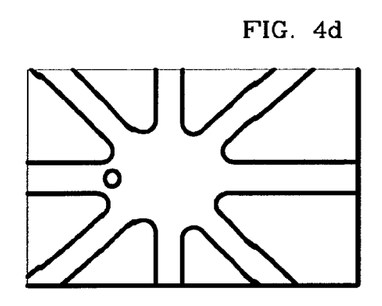
Figure 4E:
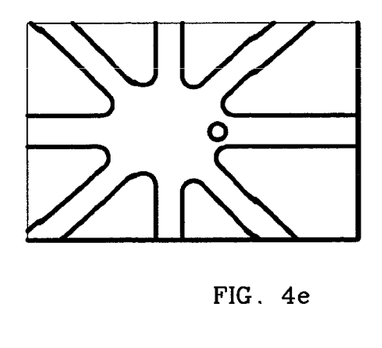

Another biological application for the electrophoretic micro-well is as a micro-volume particle centrifuge. This micro-volume centrifuge can be used to separate organic materials according to their mass and in the case of a single cell, the electrophoretic micro-well can be used to introduce material into or extract material out of the cell membrane. The driving force behind this centrifuge is the induced spin of the organic particle when placed in a rotating electric field. This electric field produces a torque on the particle proportional to the square of the electric field. See FIG. 3. Using the circularly symmetric electrode pattern and applying a polyphase AC excitation voltage to the electrodes, induces an angular velocity that is dependent upon the electrical and material characteristics of the cell and the solution.

1.3 Exemplary Manipulations Achieved

An electrophoretic micro-well in accordance with the present invention can be fabricated over broad ranges of both (i) electrode and well structure sizes and (ii) inter-electrode spacing. Manipulation of a negatively charged opaque polystyrene bead—which is equivalent to a transparent spherical microlens but which shows up better in the photomicrographs—is shown in FIG. 4, consisting of FIGS. 4a through 4e.

FIG. 4, consisting of FIGS. 4a through 4e, particularly shows both center alignment and motion in two dimensions within the electrophoretic micro-well of the present invention. Moreover, as well as the movement and placement clearly evident in FIG. 4, each of alignment, modulation, and beam deflection in the electrophoretic micro-well can also be demonstrated.

2. Materials and Methods

2.1 Fabrication of the Electrodes and Microfluidic Well

Figure 5A:
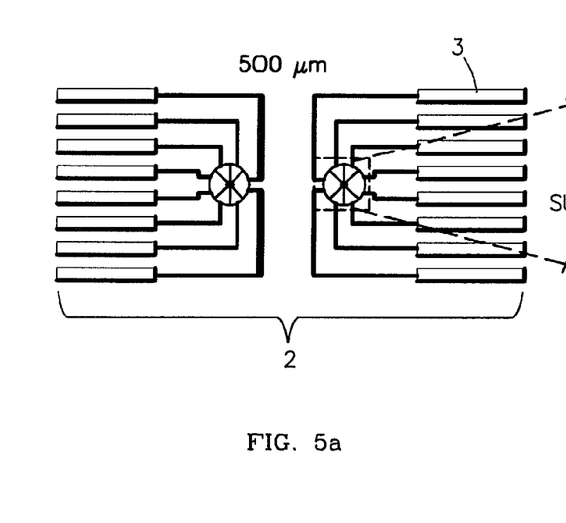
FIG. 5a shows an electrode pattern with 500 μm separation of one preferred electrophoretic micro-well in accordance with the present invention.

The electrophoretic micro-well is designed to use the electrophoretic force to actively manipulate the microlens, producing two-dimensional motion. In the first stage of development, we created a circularly symmetric, patterned electrode structure that consists of eight independently addressed electrodes by evaporating Au on quartz with a thin chrome wetting-layer. See FIG. 5a showing an electrode pattern with 500 μm separation.

Figure 5B:
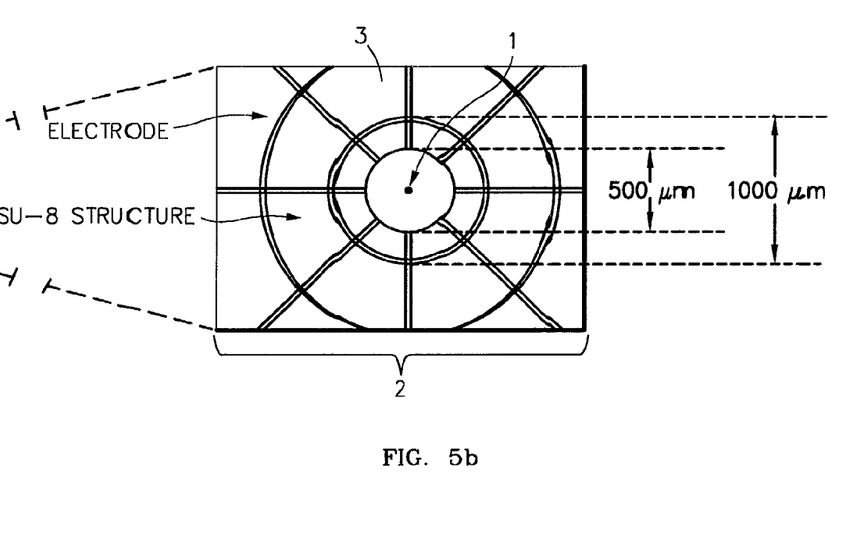
FIG. 5b shows a magnification of electrode pattern of FIG. 5a with SU-8 patterned microfluidic well (inner diameter of 1000 μm and height of 100 μm).
Figure 6A:
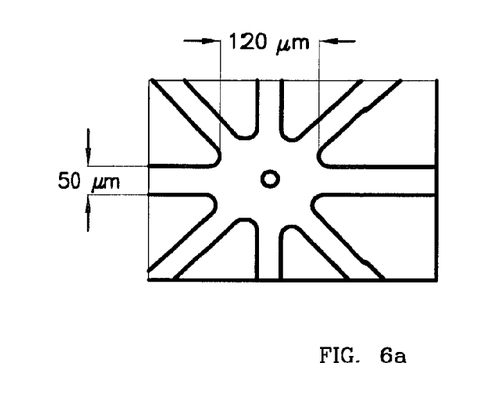
Figure 6B:
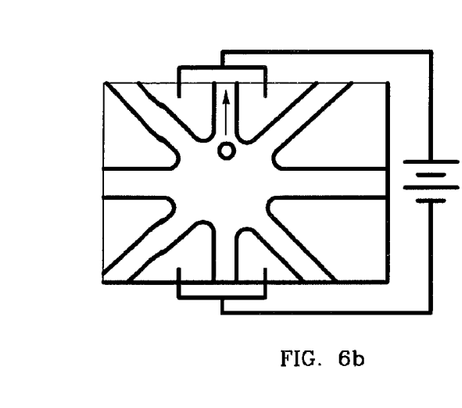
Figure 6C:
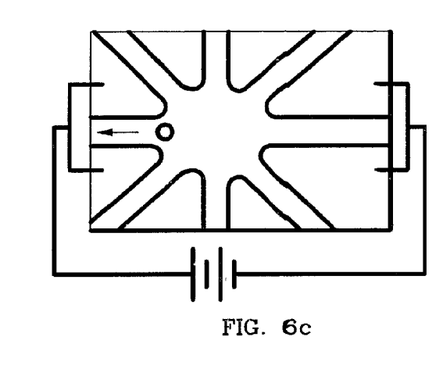
Figure 6D:
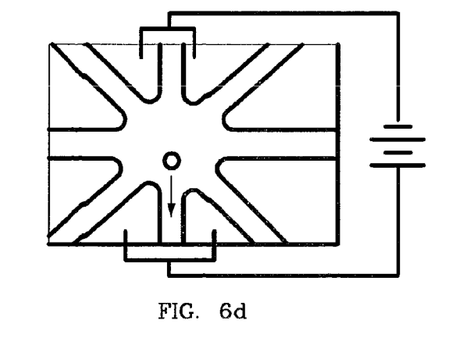
Figure 6E:
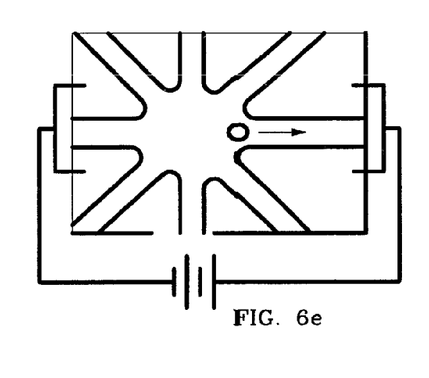
Figure 7A:
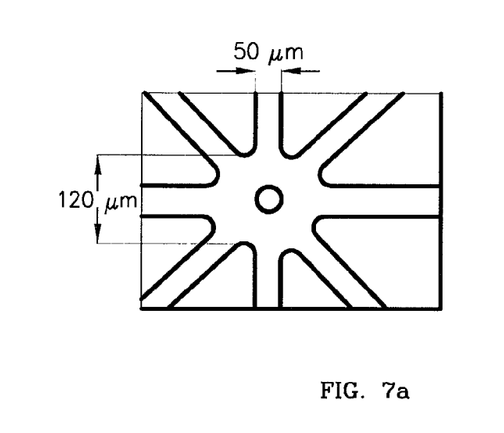
Figure 7B:
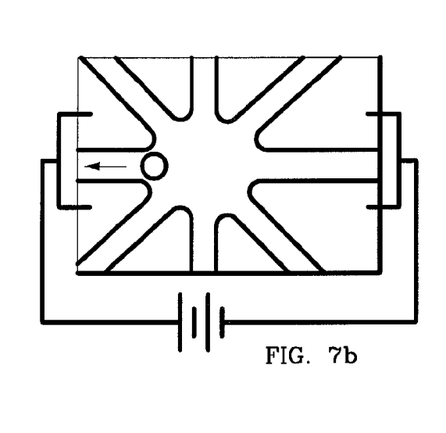
Figure 7C:
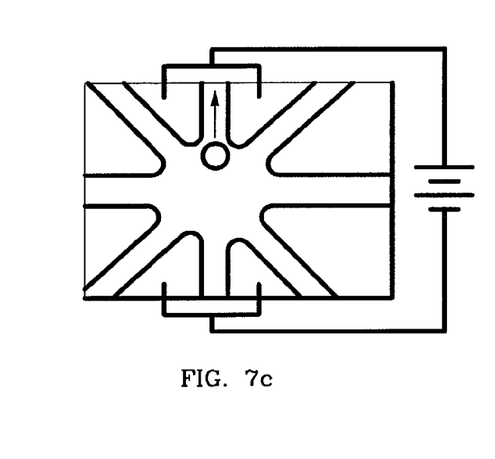
Figure 7D:
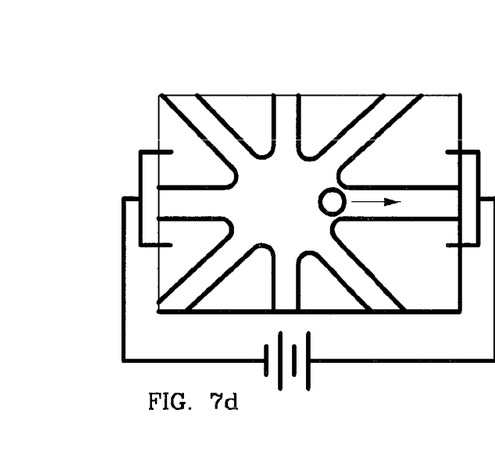
Figure 7E:
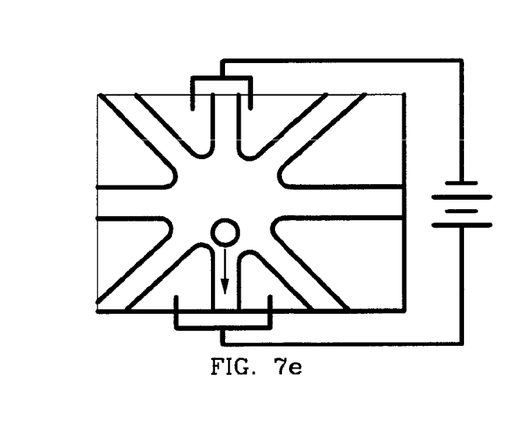

More recently, the electrodes are fabricated using indium tin oxide (ITO) (Delta Technologies LTD.) to prevent the delamination that was caused by current heating of the electrodes. Next fabricated was a cylindrically shaped, microfluidic well by lithographically patterning Epon SU-8 negative photopolymer resin, which by controlling the spin speed, can create structures anywhere from 1 to 200 μm in height with very high aspect ratios. See FIG. 5b showing a magnification of electrode pattern of FIG. 5a with SU-8 patterned microfluidic well having an inner diameter of 1000 μm and a height of 100 μm.

Such an electrophoretic micro-well can immediately and readily be used to demonstrate controlled movement of 0.87 μm to 40 μm diameter polystyrene microspheres. The microspheres will exhibit a negative charge in a de-ionized water (DI H2O) solution, and can thus be manipulated by electrophoretic forces exerted by an electric field originating from a potential difference between opposing electrodes.

More significantly, the same electrophoretic micro-well can be used to manipulate spherical microlenses, as is next discussed.

2.2 Device Assembly

Once the electrodes and microfluidic well were fabricated, voltage leads were soldered to the metal contacts and the ball lens and solution were pipetted into the microfluidic well, filling a volume of 78 nanoliters. Prior to assembly, the ball lens was washed in sodium dodecyl sulfate (SDS), which is a detergent used to negatively charge to the surface of the microlens. To prevent evaporation of the solution, a cover slip was placed over the well. For all the experimental results listed in the next section, the electrolytic solution consisted of 20% glycerol and 80% DI H₂O to increase the buoyancy of the microlens, the electrode separation was 120 μm, and the microfluidic well dimensions were 100 μm in height by 1000 μm in diameter.

3. Theory

3.1 Electrophoresis of a Microsphere

The electrophoretic force and the particle velocity can be obtained by solving Poisson's equation. See Sawatzky, R. P., Babchin, A. J., "Hydrodynamics of electrophoretic motion in an alternating electric field", *J. Fluid Mech.*, vol. 246, pp. 321–334, 1993.

$$\frac{\delta^2 \psi}{\delta z^2} = \frac{\rho}{\epsilon}$$

where $\psi$ is the electrostatic potential, $\rho$ is the charge density, and $\in$ is the dielectric permittivity of the solution. This serves to counterbalance the force with the fluid drag on the microsphere. See Fox, R., McDonald, A., *Introduction to Fluid Mechanics* (4$^{th}$ Ed.), chpt. 5, Wiley, 1992.

$$F_D \approx \eta A \left( \frac{\delta^2 \upsilon}{\delta z^2} \right) \delta z$$

In the above equation, A is the surface area of the microsphere, $\upsilon$ is the velocity, and $\eta$ is the fluid viscosity. The sum of the opposing forces results in a zero net acceleration and a constant velocity. Assuming that the charge in the electric double layer is equal to the charge of the microsphere, then the force of the applied electric field can be either calculated by using the charge density of the ions in the double layer or the charge of the microsphere. See Ramos, A., Morgan, H., Green, N., and Castellanos, A., "The role of electrohydrodynamic forces in the dielectrophoretic manipulation and separation of particles", *Journal of Electrostatics*, vol. 47, pp. 71–81, 1999. See also Russel, W., Saville, D., and Schowalter, W., *Colloidal Dispersions*, chpts. 2–8,11, Cambridge University Press, 1989. See also Jones, T., *Electromechanics of Particles*, chpts. 1–3, Cambridge University Press, 1995.

In other words:

$$F_E = -qE = \rho E$$

Substituting $\rho$ from Poisson's equation (1) into equation (3) yields the force of the applied electric field on the electric double layer of the microsphere:

$$F_E = \rho E = \epsilon E \frac{\delta^2 \psi}{\delta z^2}$$

Combining equations (2) and (4) and solving the second-order differential equation using the appropriate boundary conditions. See Ramos, supra. The resulting electrophoretic velocity is:

$$\upsilon_{EP} = \left( \frac{\epsilon \zeta E}{\eta} \right) f(\kappa \alpha, \zeta)$$

where $\zeta$ is called the Zeta potential and can be described as the potential drop across an effective Debye length $\kappa$, $\alpha$ is the radius of the microsphere, and $$\tfrac{2}{3} \leq f(\kappa, \alpha, \zeta) \leq 1$$

is called the Smoluchowski function. See Henry, D. C., "The Cataphoresis of suspended particles, Part I: The equations of cataphoresis", *Proceedings of the Royal Society of London*, A., vol. 133, pp. 106, 1931. The Smoluchowski function varies according to the size of the effective Debye length of the microsphere with respect to its radius and according to the Zeta potential. For the purposes of calculating the electrophoretic velocity, we approximated the electric field using a parallel-plate capacitor model, i.e.

$$E = \frac{V}{\epsilon_r d}$$

where V is the voltage applied across the electrodes, d is the electrode spacing, and is the relative dielectric permittivity of the solution. The theoretical calculation of the electrophoretic velocity will be used later in this specification in verification of the results of the microlens velocity measured from experiment.

4. Results and Discussion

Polystyrene and borosilicate glass microspheres ranging from 0.87 µm to 40 µm diameter may be move and positioned with the apparatus as described, with sizes in the range of 100 µm to 200 µm and larger manipulatable by larger apparatus. Practically speaking, the usefulness of a sub-micron or micron-size lens has not yet come into fruition, so the instant invention is presently most commonly used on two of the larger-sized lenses: 20 µm and 40 µm. See FIG. 6 and FIG. 7. The positioning of a 20 µm polystyrene microsphere using the electrophoretic force (V=3V, C=1.1 µA) is shown in FIGS. 6a through 6e. The positioning of a 40 µm borosilicate microsphere using the electrophoretic force under HeNe laser illumination (V=3V, C=1.0 µA) is shown in FIGS. 7a through 7e.

The physical parameter relevant to calculation of electrophoretic velocity may all be measured. The zeta potentials of the 20 µm polystyrene and the 40 µm borosilicate ball lenses after being negatively charged with SDS were measured using a Laser Zee Meter from Pen Kem, Inc. To enhance the electric field, the electrodes were operated pair-wise such that voltage was applied to two adjacent electrodes and the opposite two electrodes were grounded. The result of this measurement, and still other measured system parameters, are as follows. Viscosity ($\eta$) was measured to be 2.501 cP (centipoise) (where 1 cP=0.1 kg/cm sec). The average zeta potential ($\zeta_{avg}$) was measured to be −80 mV. The relative dielectric constant of solution ($\epsilon_r$) was measured to be 71.6. Finally, the electric field (E) was measured to be 7 V/cm for the 20 µm sphere, and 8 V/cm for the 40 µm sphere.

Substituting the values above into the equation for υ, supra, yields the following range of theoretical electrophoretic velocities for each microlens. For the 20 µm sphere:

$\upsilon_{EP}$=9.44 µm/s ⇒ $f(\kappa a, \zeta)$=⅔

$\upsilon_{EP}$=14.15 µm/s ⇒ $f(\kappa a, \zeta)$=1

For the 20 µm sphere:

$\upsilon_{EP}$=10.8 µm/s ⇒ $f(\kappa a, \zeta)$=⅔

$\upsilon_{EP}$=16.2 µm/s ⇒ $f(\kappa a, \zeta)$=1

In conducting the experiment, the velocities of the 20 µm and 40 µm spherical (ball) lenses were experimentally measured multiple times and averaged together resulting in electrophoretic velocities of about 13 µm/s and 15 µm/s respectively. As can be seen, the experimentally measured velocities lie within the predicted range set by the theoretical calculation and thereby demonstrate that the electrophoretic force is strong enough to manipulate objects in the tens of microns size.

The positioning of a 20 µm polystyrene microsphere using the electrophoretic force (V=3V, C=1.1 µA) is shown in FIG. 6. The positioning of a 40 µm borosilicate microsphere using the electrophoretic force under HeNe laser illumination (V=3V, C=1.0 µA) is shown in FIG. 7.

The electrophoretic force though, does have its limitations and in the process of conducting these experiments, we observed the performance of our electrophoretic system decay for very small diameters and also for larger diameter microspheres. In the limit of very small diameters (~1 µm), the microspheres were easily manipulated by the induced electric field, but the relative Brownian motion of the microspheres inhibited precise control and placement. As the diameter of the microsphere increases, the Brownian motion decreases but forces such as gravity and surface stiction begin to interact with the microsphere creating inertial forces that can prevent or inhibit motion. In addition, the SDS detergent used to negatively charge the microspheres is not permanently attached to the microlens and the charge can fade away with time. With some investigation into surface treatments, we were able to minimize the surface adhesion forces by coating the surface with a layer of CYTOP (Asahi Glass Co., Ltd), which is a hydrophobic perfluoropolymer that can be spin-coated and patterned onto the substrate. Additionally, we are currently investigating other lens materials that have lower densities and that can sustain a higher negative charge in order to combat the effects of gravity and charge evanescence.

5. Conclusion 5.1 A Related Paper of the Inventors

Substantial of the content of the present application may be found within the SPIE Proceedings as the paper Micro- and nano-optics for optical interconnection and information processing: 29–31 Jul. 2001, San Diego, USA, Mohammad R. Taghizadeh, Hugo Thienpont, Ghassan E. Jabbour, chairs/editors ; sponsored by SPIE—the International Society for Optical Engineering Bellingham, Wash., USA: SPIE, c2001 vii, 306 p. : ill. (come col.); 28 cm Series title: SPIE proceedings series; v. 4455 4007709337, Proceedings of SPIE—the International Society for Optical Engineering; v. 4455.

5.2 Optical Configurations

Use of the present invention in its optical configuration for manipulation of optical components such as micromirrors and, particularly, microlenses offers many advantages. Integration with Vertical Cavity Surface Emitting Lasers (VCSELs) or other micro optical components (e.g. optical fibers, waveguides, etc.) is readily realized. The preferred optically transparent substrates reduce intensity and scattering losses.

By precision alignment of the microlens to the laser beam, and if feedback is introduced, it is possible to actively compensate for misalignments over time.

Laser beam deflection and modulation in two dimensions is via lateral movements of the microlens, as has been explained. This can be accomplished, as in the set-up of an optical switch, relatively quickly, and on the order of milliseconds.

Lithographic patterning of the electrophoretic micro-well permits use of the electrophoretic micro-well of the invention both with a single VCSEL or in a one or two-dimensional VCSEL array with independent control over each individual microfluidic element.

5.3 Biological Configurations

Certain configuration so the electrophoretic micro-well of the present invention permit electro-rotation. Namely, using a circularly symmetric electrode structure and applying a phase delayed voltage signal to successive electrodes will produce a torque that rotates the object, most commonly a cell.

A micro-volume centrifuge for either (i) multi-cell separation or (ii) extraction of components from within a single cell can also be realized. In all cases (i) introduction or delivery of a component into the cell, or (ii) extraction of a component from the cell, is due to shear forces from rotation of the component and/or the cell. As an interesting intellectual exercise, the construction of a multiple electrophoresis wells each of which receives in turn a same cell in order to controllably selectively introduce some particular material into the cell may be envisioned.

The present invention generally reduces the bio-assay time to incorporate an component or chemical into any cell, permits cell alignment and patterning, permits ordering of cells by charge.

Patterning of cells is straightforward in accordance with electrode arrangement and symmetry. For example, multiple lithographically patterned microfluidic wells may be arranged two-dimensional matrix to increase parallelism and/or simultaneity in either the same, or in different, experimental trials.

5.4 General

Over the past decade, optical and electronic technologies scaled down to such a point to be useful in the areas of biology and chemistry. Intermixing electrical, optical, and biological technologies has led to the development of many new areas of research such as Bio-MEMS. The present invention demonstrated that the electrophoretic force can be used to manipulate a small, micrometer-size, object such as a microlens within a microfluidic well. In particular, by negatively charging a spherical microlens and applying an electric field in an aqueous solution it was possible to move the microlens at velocities ranging from 13 $\mu$m/s to 15 $\mu$m/s, and to accurately reposition the microlens to various places within the microfluidic well.

The microlens can likewise be positioned and aligned to an optical fiber and various other sources such as laser diodes or VCSELs. Replication of the electrophoresis wells of the present invention in an array form can accommodate both (i) optical fiber bundles and (ii) VCSEL arrays.

In accordance with the preceding explanation, variations and adaptations of the (i) electrophoretic well, and the (ii) Processes and purposes of using the same, in accordance with the present invention will suggest themselves to a practitioner of the electrophoretic and/or optical arts. For example, it may prove that non-spherical lens shapes and/or other optically transparent materials will be well, or even better, suited to interact with the electrophoretic force of the present invention than the example geometries and materials described herein.

In accordance with these and other possible variations and adaptations of the present invention, the scope of the invention should be determined in accordance with the following claims, only, and not solely in accordance with that embodiment within which the invention has been taught.

What is claimed is:

1. An apparatus for moving a micrometer size object having a first dielectric permittivity comprising:

a micro-well including a substrate, electrodes on the substrate in position to produce an electrical field in the micro-well, a dielectric fluid located on the substate, comprising a dielectric permittivity different from the first dielectric permittivity; and a source of electricity to the electrodes to produce the electrical field in the micro-well, wherein the a micrometer size object within the micro-well is configured to move by electrophoresis or dielectrophoresis, wherein the micro-well comprises an electrophoretic micro-well or a dielectrophoretic micro-well, wherein the micrometer size object comprises a microlens; and an optical light beam aligner to align the microlens with an optical light beam, wherein the optical light beam comprises a laser light beam.

2. The apparatus according to claim 1 wherein the apparatus is configured for positional movement of the micrometer size object, wherein the micro-well includes at least two of the electrodes.

3. The apparatus according to claim 2 wherein the apparatus is configured for two-dimensional positional movement of the micrometer size object, wherein the micro-well includes at least four of the electrodes.

4. The apparatus according to claim 1 wherein the apparatus is configured for the angular rotational movement of the object, wherein the micro-well includes at least four of the electrodes.

5. The apparatus according to claim 1 wherein the apparatus is configured for the positional transportation and placement of the microlens to optically focus, deflect, or scatter a laser light beam.

6. The apparatus according to claim 5 wherein the apparatus is configured for dimensional positional transportation and placement of the microlens in two dimensions.

7. The apparatus according to claim 6 further comprising:

a source of a laser light beam passed through the microlens;

wherein a direction of the laser light passed through the microlens lens is altered in accordance with the positional transportation and placement of the microlens under electrophoretic forces or dielectrophoretic forces within the apparatus.

8. The apparatus according to claim 1 wherein the substrate comprises:

a material comprising any of glass, quartz, or an optically transparent material.

9. The apparatus according to claim 1 wherein the micro-well comprises:

a lithographically-formed pattern.

10. The apparatus according to claim 1 wherein any of the electrodes on the substrate comprise any of:

lithographically patterned gold, or indium tin oxide (ITO).

11. The apparatus according to claim 1 wherein the electrodes comprise:

four or more electrodes that are positioned to be circularly symmetrically arrayed about the micro-well.

12. The apparatus according to claim 11 wherein the source of electricity comprises:

a source of differing phases of electrical voltages applied to each of the four or more circularly symmetrically arrayed electrodes, wherein the source of electricity is configured to induce an angular rotational torque on the micrometer size object.

13. A method of moving a microlens having a first dielectric permittivity comprising:
placing the microlens in an micro-well having (i) a substrate, (ii) electrodes on the substrate in position to produce an electrical field in the micro-well, and (iii) a dielectric fluid on the substrate, the dielectric fluid having a dielectric permittivity different from the first dielectric permittivity;
applying electrical energy to the electrodes to move the microlens in the micro-well by electrophoretic forces or dielectrophoretic forces, wherein the micro-well comprises an electrophoretic micro-well or a dielectrophoretic micro-well, wherein the microlens comprises a micrometer organic object or a micrometer inorganic object; and
moving the microlens to be aligned with a laser light beam, wherein the electrical energy comprises an electrical voltage or an electrical current.

14. The method according to claim 13, wherein direct current, d.c., is applied to the electrodes to move the microlens in the field.

15. The method according to claim 14 wherein alternating current, a.c., is applied to the electrodes to move the microlens by dielectrophoresis.

16. The method according to claim 13 wherein the placing of the microlens is in a micro-well having (iii) four or more of the electrodes on the substrate in position to produce an electrical field in the micro-well; and
wherein the four or more electrodes on the substrate are energized to selectively move the microlens in two dimensions.

17. The method according to claim 16 wherein the four or more electrodes are circularly arrayed about the micro-well; and
wherein the applying comprises electrical energy of a different phase to each of the four electrodes to induce an angular rotational torque on the microlens placed within the micro-well.

18. A method of moving a microlens having a first dielectric permittivity comprising:
placing the microlens in an micro-well having (i) a substrate, (ii) electrodes on the substrate in position to produce an electrical field in the micro-well, and (iii) a dielectric fluid on the substrate, the dielectric fluid having a dielectric permittivity different from the first dielectric permittivity; and
applying electrical energy to the electrodes to move the microlens in the micro-well by electrophoretic forces or dielectrophoretic forces, wherein the micro-well comprises an electrophoretic micro-well or a dielectrophoretic micro-well, wherein the microlens comprises a micrometer organic object or a micrometer inorganic object; and
moving the microlens to be aligned with a laser light beam;
wherein a source of compact laser light beams comprising any of optical fibers, VCSELs, LEDs, and photodetectors is configured to generate the laser beam, and
wherein the microlens aligned to the laser light beam from a source comprises a diameter less than or equal to 25% of a diameter of the laser light beam;
wherein the microlens is substantially the same diameter as the laser light beam to which the microlens is aligned, wherein the alignment is precise such that insubstantial laser light will not be impingent upon the microlens when aligned.

19. An method of aligning a micrometer size optical element to a laser light beam for coupling light into or out of any of an optical fiber, a vertical cavity surface emitting laser (VCSEL), a light emitting diode (LED), and a photodetector, the method comprising:
placing the micrometer size optical element a micro-well having a substrate, (ii) a substrate, (iii) electrodes on the substrate in position to produce an electrical field in the micro-well, and (iv) a dielectric fluid on the substrate, the dielectric fluid having a dielectric permittivity different from a dielectric permittivity of the micrometer size optical element; and
applying electrical energy to the electrodes to move the micrometer size optical element in the micro-well into alignment with an impingent laser light beam, by electrophoretic forces or dielectrophoretic forces, wherein the micro-well comprises an electrophoretic micro-well or a dielectrophoretic micro-well.

20. The method according to claim 19 further comprising aligning a microlens to the laser light beam.

21. The method according to claim 20 wherein the aligning the microlens to the laser light beam comprises aligning the microlens to the laser light beam in two dimensions, wherein each dimension is orthogonal to the beam.

22. The method according to claim 21 further comprising aligning a multiplicity of microlens to a plurality of laser light beams at close dimensional tolerances.

* * * * *